United States Patent [19]  [11] 4,339,159
Miller  [45] Jul. 13, 1982

[54] CONVEYOR ROLLER BEARINGS

[76] Inventor: Donald A. Miller, 7315 Glastonbury Dr., Hudson, Ohio 44236

[21] Appl. No.: 184,640

[22] Filed: Sep. 8, 1980

[51] Int. Cl.³ .............................................. F16C 13/00
[52] U.S. Cl. .............................. 308/20; 308/DIG. 11
[58] Field of Search .............. 308/20, DIG. 11, 189 R

[56] References Cited
U.S. PATENT DOCUMENTS

| | | | |
|---|---|---|---|
| 1,238,880 | 9/1917 | Buck | 308/20 |
| 1,856,547 | 5/1932 | Gotthardt | 308/20 |
| 2,074,901 | 3/1937 | Gotthardt et al. | 308/20 |
| 3,381,798 | 5/1968 | Kornylak | 308/20 |

FOREIGN PATENT DOCUMENTS 1478993  7/1977  United Kingdom ................. 308/20

Primary Examiner—Willis Little

[57] ABSTRACT

Conveyor bearing apparatus for registration in the end of a cylindrical tubular roller of a conveyor, the casing of the bearing being provided with a plurality of substantially parallel axially extending extensions formed integrally on the casing, the extensions are inwardly tapered toward the radially inward extending rim of the bearing and terminates short of the radially inward extending rim and flares circumferentially into the radially outward extending flange of the bearing whereby an interference fit is effected between the bearing and the inner cylindrical surface of the cylindrical tubular roller.

5 Claims, 6 Drawing Figures

CONVEYOR ROLLER BEARINGS

BACKGROUND OF THE INVENTION

This invention relates to bearings for roller conveyors.

Typically, roller conveyors have plural rollers aligned on parallel axes tranverse to a direction of conveyor flow. Hexagonal bars extend through the hollow tubular rollers and are fixed in hexagonal openings in parallel side frames. The rollers have bearings at each end. Outer races of the bearings hold the outer ends of the tubular rollers, and inner races of the bearings receive the hexagonal bars.

Historically axial ends of the tubular rollers are mechanically connected to outer casings or races of the bearings. One prior art method of mechanically connecting the bearings to the tubular rollers involves the insertion of the bearing within each end of the tubular rollers and swaging the tubular roller end around the outer surface of the bearing casings. The swaging deforms not only the ends of the tubular rollers but also the outer casings of the bearings, and such deformation tends to preload the bearings. This preloading may cause premature failure of the bearings. In addition, once the bearings are so swaged into place, they cannot be individually replaced, and accordingly, the entire roller-bearing assembly must be discarded if either bearing fails. Alternatively, outer cylindrical surfaces of the outer races, or complementary inner cylindrical surfaces of the ends of tubes, or both, may be carefully machined to produce interference fits.

Both prior art methods require expensive machining or crimping steps and make extraction and replacement of bearings difficult.

Welding of roller ends to bearings is not desired because it makes replacement of worn rollers or bearings difficult and because welding may injure bearings or rollers or may require unusual and more expensive greasing packing sequences.

In all cases, it is highly desirable to be able to replace an repair rollers and bearings and interfit rollers and bearings in the field as quickly as possible with minimal conveyor down time. Because of the great numbers of rollers and bearings in each conveyor, it is desirable to use inexpensive non-machined parts which do not require holding to close tolerances.

SUMMARY OF THE INVENTION

The present invention overcomes problems of the prior art and provides inexpensive rollers and bearings by providing extension ridges on bearing casings which receive and tightly grip inner cylindrical surfaces of rollers without requiring close tolerances or machining or crimping operations. The bearings and roller assemblies of the present invention are easily and quickly disassembled and reassembled in the field and provide safe and adequate connection.

The conveyor roller bearing apparatus has an inner race, an outer race and discrete bearing elements positioned between the inner race and outer race for reducing friction in relative rotation between the inner race and outer race. A casing means on one of the races connects the race to an object to be rotated with respect to the other of the races. The casing and the object to be rotated have complementary concentric mounting surfaces. One of the mounting surfaces has extensions which extend outward from that surface toward the other surface for contacting the other surface at spaced areas.

Preferably, the casing is mounted radially outward on the outer race, and one of the complementary surfaces is a radially outer surface of the casing, and the extensions extend radially outward from the outer surface of the casing. The casing has first and second axial ends. The first end may have a radially outward extending flange, and the extensions extend axially from the flange, if provided, toward the second end.

The extensions axially terminate short of the second end, and axial ends of the extensions near the second end taper inwardly. The extensions flare circumferentially outwardly into the flange.

Preferably, the second end of the casing has a radially inward extending rim, and the outer race is supported axially against the inward extending rim. The outer race has a cylindrical surface supported radially by a complementary cylindrical portion of the casing.

Inward detents formed in the complementary cylindrical portion of the casing at positions spaced from the rim hold the outer race in the casing. A radially extending dust shield is interposed between the detents and the outer race for holding the dust shield. A preferred outer race has a generally L-shape cross-section.

Another outer race has first and second complementary elements with outward radially extending portions and inward axially oppositely curved portions for retaining the bearing elements. The outer portions are axially held between the rim and the dust shield.

In a preferred embodiment the inner race has an annular bore with hexagonally arranged radially extending facets for receiving a hexagonal mounting bar. A roller tube has an inner surface of an end portion held by the extensions of the casing and having an axial terminus abutted against the flange.

These and other features and objects of the invention are apparent in the disclosure which includes the drawings and specification, including the above and ongoing description and claims.

DETAILED DESCRIPTION OF THE DRAWINGS

Figure 1:
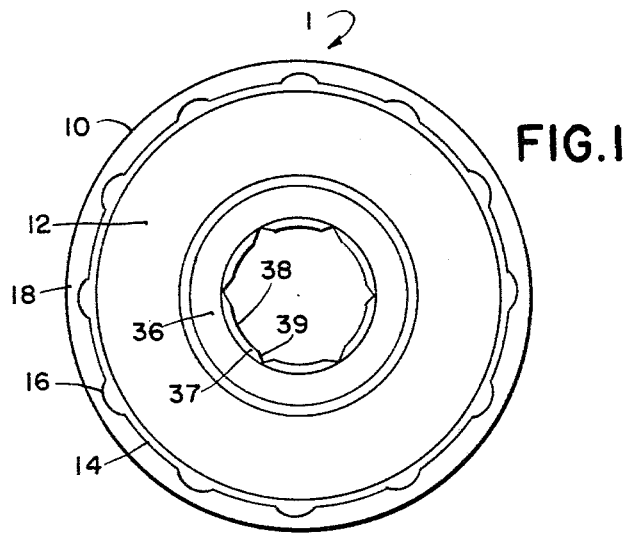
FIG. 1 is an end elevation of a conveyor roller bearing constructed according to the present invention.
Figure 2:
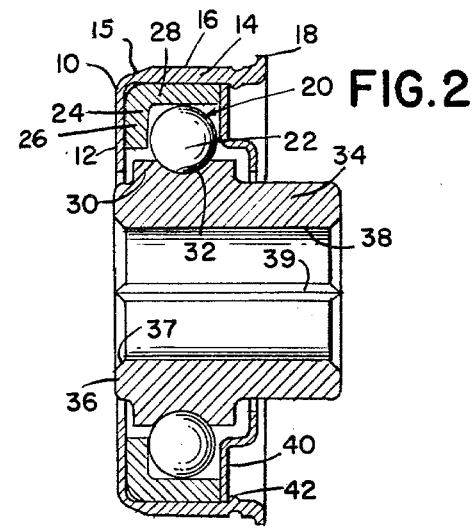
FIG. 2 is a cross-section of the bearing shown in FIG. 1.

Referring to FIGS. 1-4, a conveyor roller bearing is generally indicated by the numeral 1.

The casing 10 has a radially extending rim at one axial end of a cylindrical portion 14. Axial ridgelike extensions 16 are formed outwardly from the cylindrical portion 14 of casing 10. A radially outwardly extending flange 18 is formed on the opposite end of cylindrical portion 14 of casing 10. Extensions 16 have inwardly tapered ends 15 near flange 12. Ends 19 of extensions 16 flare circumferentially into flange 18.

The inner bearing elements 20 include discrete ball bearing elements 22, outer race member 24 and inner race member 30. Outer race member 24 includes a radially extending portion 26 which bears axially against rim 12 of casing 10. Cylindrical portion 28 of the outer race is held tightly within the cylindrical portion 14 of casing 10.

The outer race member 24 supports the cylindrical section 14 of casing 10. Casing 10 thus may be constructed of a relatively thin material from which extensions 16 may be outwardly formed. The relatively rigid outer race member 24 supports the cylindrical portion 14 while a tubular roller is assembled on the extensions 16 in interference fit therewith.

Inner race member 30 has a groove 32 to retain the several balls 22. Body 34 extends axially between radial ends 36 with sloped chamfers 37. Bore 38 extends through inner race 30 and has radially extending facets 39 which receive edges of a conventional hexagonal shaft. Hardened dust shield 40 is anchored between inward formed detents 42 and an axial end of the outer race 24.

Figure 4:
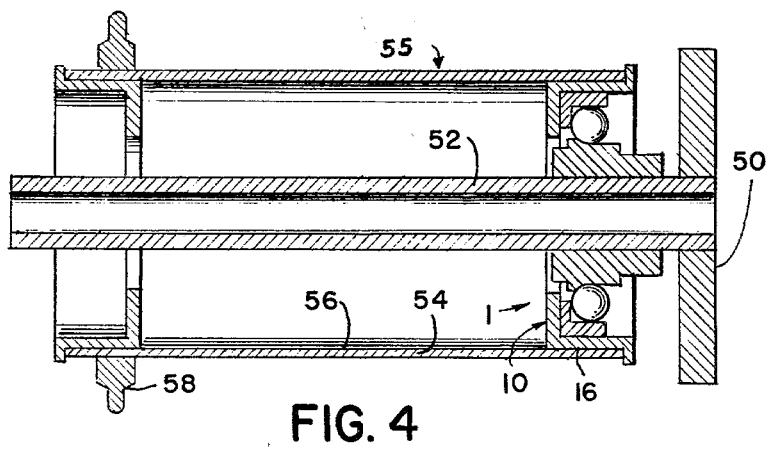
FIG. 4 is a schematic representation of the bearing assembled in the tubular roller and held on a hexagonal bar, which is fixed in a frame.
Figure 3:
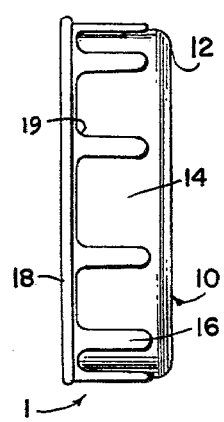
FIG. 3 is a side elevation of the bearing shown in FIG. 1.

As shown in FIG. 4, side frame 50 has an opening which receives hexagonal shaft 52. Roller 55 has a uniform internal cylindrical surface 56, ends of which are received and tightly held in interference fit on outward extensions 16 of casing 10.

In the case of a chain-driven roller, a sprocket 58 is connected to the outer surface of tube 54 at one end thereof.

Figure 5:
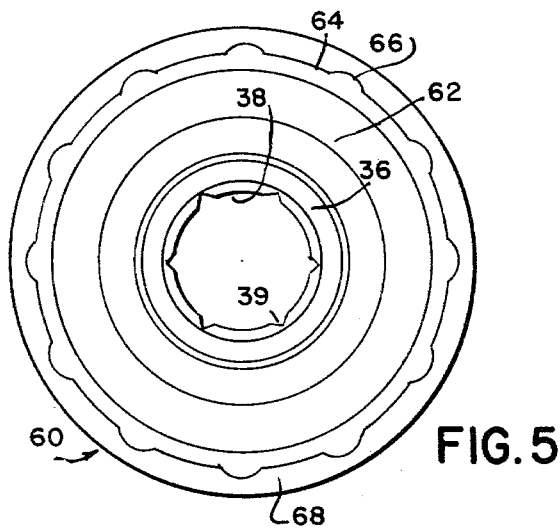
FIG. 5 is an end elevation of an alternate bearing constructed according to the present invention.
Figure 6:
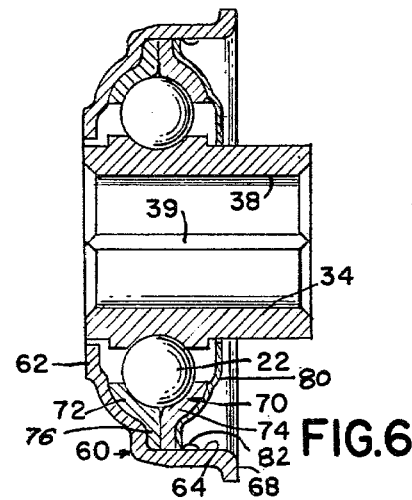
FIG. 6 is a cross-section of the bearing shown in FIG. 5.

A modified form of the bearing is shown in FIGS. 5 and 6. Casing 60 has a radially extending rim portion 62. Extension ridges 66 are bent outward from cylindrical portion 64. The casing terminates at one axial end in flange 64. The outer race 70 is formed of two similar elements having oppositely curved inward portions 72 and 74 for receiving ball 22 and having parallel outer portions 76 which are held between rim 62 and dust shield 80. Detents 82 hold the dust shield in its assembled position. As shown in the drawings, rim 62 and dust shield 80 are curved in a manner complementary to portions 72 and 74.

The outward extensions on the casing tightly grip rollers while eliminating the need for expensive machinings, tolerances and crimpings. Rollers and bearings may be easily interchanged for repair or replacement of parts.

While the invention has been described with reference to specific embodiments, modifications and variations may be constructed without departing from the scope of the invention, which is particularly pointed out in the following claims.

What is claimed is:

1. Conveyor bearing apparatus for registration in the end of a cylindrical tubular roller of a conveyor having an inner race, an outer race and discrete bearing elements positioned between the inner race and outer race for reducing friction in relative rotation between the inner race and outer race, casing means on one of the races for connecting the race to an object to be rotated with respect to the other of said races, the casing means and the object to be rotated having complementary concentric mounting surfaces, said casing is mounted radially outward on the outer race, one of said complementary surfaces being a cylindrical outer race of said casing, said casing having first and second axial ends, said first end has a radially outward extending flange, said second end comprises a radially inward extending rim and wherein the outer race is supported axially against the inward extending rim and said outer race has a cylindrical surface supported radially by a complementary cylindrical portion of the casing, the improvement comprising: a plurality of substantially parallel axially extending extensions formed integrally on said casing, said extensions are inwardly tapered toward said radially inward extending rim and terminates short of said radially inward extending rim and flares circumferentially into said radially outward extending flange whereby an interference fit is effected between said conveyor roller bearing and the inner cylindrical surface of said cylindrical tubular roller.

2. The apparatus of claim 1 further comprising a radially extending dust shield interposed between the detents and the outer race for holding the dust shield therebetween.

3. The apparatus of claim 2 wherein the outer race has a generally L-shape cross-section.

4. The apparatus of claim 2 wherein the outer race comprises first and second complementary elements having outward radially extending portions and having inward axially oppositely curved portions for retaining the bearing elements, wherein the outer portions are axially held between the rim and the dust shield.

5. The apparatus of claim 1 wherein the inner race has an annular bore extending therethrough with hexagonally arranged radially extending facets for receiving a hexagonal mounting bar therein and wherein the object to be rotated is a roller tube having an inner surface of an end portion held by the extensions and having an axial terminus abutted against the flange.

* * * * *